United States Patent

Urbansky

[11] Patent Number: 5,859,882
[45] Date of Patent: Jan. 12, 1999

[54] TRANSMISSION SYSTEM CONTROL CIRCUIT INCLUDING COMPARATOR APPARATUS

[75] Inventor: Ralph Urbansky, Schwaig b. Nürnberg, Germany

[73] Assignee: Lucent Technologies Inc., Murray Hill, N.J.

[21] Appl. No.: 541,384

[22] Filed: Oct. 10, 1995

[30] Foreign Application Priority Data

Oct. 18, 1994 [DE] Germany .......................... 44 37 136.5

[51] Int. Cl.$^6$ .............................. H04L 7/033; H03L 7/087
[52] U.S. Cl. ........................................... 375/375; 327/160
[58] Field of Search ................................... 375/363, 362, 375/354, 371, 372, 376; 370/505, 506, 509; 327/141, 155, 156, 157, 160

[56] References Cited

U.S. PATENT DOCUMENTS

| | | | |
|---|---|---|---|
| 5,132,970 | 7/1992 | Urbansky | 370/102 |
| 5,172,376 | 12/1992 | Chopping et al. | 370/100.1 |
| 5,195,088 | 3/1993 | Urbansky | 370/84 |
| 5,260,940 | 11/1993 | Urbansky | 370/84 |
| 5,263,056 | 11/1993 | Urbansky | 375/112 |
| 5,268,936 | 12/1993 | Bernardy | 375/118 |
| 5,331,671 | 7/1994 | Urbansky | 375/118 |
| 5,343,476 | 8/1994 | Urbansky | 370/102 |
| 5,359,605 | 10/1994 | Urbansky et al. | 370/102 |
| 5,361,263 | 11/1994 | Urbansky | 370/102 |
| 5,537,447 | 7/1996 | Urbansky | 375/372 |
| 5,563,877 | 10/1996 | Van Tetering et al. | 370/85.2 |
| 5,563,891 | 10/1996 | Wang | 370/102 |
| 5,604,773 | 2/1997 | Urala | 375/372 |
| 5,617,454 | 4/1997 | Gotz et al. | 375/376 |
| 5,651,034 | 7/1997 | Oksanen et al. | 375/372 |

FOREIGN PATENT DOCUMENTS

| | | | |
|---|---|---|---|
| 0507385 | 10/1992 | European Pat. Off. | H04J 3/07 |
| 0630127A1 | 12/1994 | European Pat. Off. | H04J 3/07 |
| 4332761A1 | 3/1995 | Germany | H04L 7/00 |
| 9316536 | 8/1993 | WIPO | H04J 3/06 |

OTHER PUBLICATIONS

Klein et al., "Network Synchronization—A Challenge for SDH/Sonet?", IEEE Communications Magazine, Sep. 1993, vol. 31, No. 9, pp. 42 to 50.
CCITT Recommendation G.709. Need Copy in English.

*Primary Examiner*—Chi H. Pham
*Assistant Examiner*—William Luther

[57] ABSTRACT

The invention relates to a transmission system comprising a control circuit which circuit includes a comparator (18, 19, 20; 25 to 29; 46; 50 to 52, 57 to 60) for comparing a first input signal and a second input signal. For reducing the low-frequency phase error, the comparator (18, 19, 20; 25 to 29; 46; 50 to 52, 57 to 60) is provided for changing the state of a first comparing signal derived from the first input signal and/or the state of a second comparing signal derived from the second input signal, or the state of the output signal resulting from a combination of the two comparing signals at instants denoted by an auxiliary signal whose frequency deviates from the frequency of the signal to be changed.

9 Claims, 5 Drawing Sheets

TRANSMISSION SYSTEM CONTROL CIRCUIT INCLUDING COMPARATOR APPARATUS

BACKGROUND OF THE INVENTION

1. Field of the Invention

The invention relates to a transmission system comprising a control circuit which circuit includes a comparator for comparing a first input signal and a second input signal.

2. Description of the Related Art

Such a transmission system may be used, for example, for transmitting signals of the Synchronous Digital Hierarchy (SDH). For example, a multiplexer then combines various plesiochronous or also synchronous signals (for example STM-1 signal) to an STM16 signal (STM=Synchronous Transport Module). A synchronization circuit in the multiplexer then effects a clock alignment of an incoming signal and an outgoing signal. The justification actions necessary for the clock alignment are then carried out with pointer bytes. Such justification actions are also denoted as pointer actions in the Synchronous Digital Hierarchy.

In a demultiplexer of the transmission system, the plesiochronous or synchronous signals are then recovered by means of desynchronization circuits. Because of the frame structure and the pointer actions, phase errors occur between the input signal and the output signal of the transmission system.

Said transmission system is known from EP 0 507 385 A2 or from the article "Network synchronization—A Challenge for SDH/SONET?" by M. J. Klein and R. Urbansky, IEEE Communications Magazine, Sep. 1993, vol. 31, no. 9, pages 42 to 50. A synchronized signal (STM-1) signal of the Synchronous Digital Hierarchy is then adapted to a read clock signal. The read clock signal is generated by the first phase-locked loop (PLL) which includes at least a first comparator (phase detector), a controller and a controllable oscillator. The first comparator is supplied with the oscillator signal (read clock signal) and, for example, a control signal by a network management system of the transmission system.

For adapting the synchronized signal to the read clock signal, justification values are processed in pointers (pointer action). For the clock adaptation is used a buffer store which is controlled by a write and a read counter. The write counter is controlled by a data analyzer (pointer interpreter), which determines from the pointer values the justification values contained in the incoming synchronized signal. The read counter forms part of a control circuit which includes a subtracter, a low-pass filter, a justification decision circuit and a data generator (pointer generator). The low-pass filter is used for reducing the high-frequency phase error caused by pointer actions in the incoming signal and for reducing the frame structure-caused phase error between the input signal and output signal of the transmission system. In the justification decision circuit there is an integrator available which shifts the jitter spectrum to the high-frequency range (jitter is high-frequency phase error). A low-frequency phase error cannot be eliminated by said measures.

The justification decision circuit forms a positive justification value if the value produced by the integrator exceeds a positive threshold. If the value produced by the integrator falls short of a negative threshold, the justification decision circuit produces a negative justification value. The pointer generator generates pointer values for the outgoing signal and controls the read counter as a function of the justification values and the STM-1 frame. The read counter is stopped in the case of a positive justification decision. In the case of a negative justification decision, the read counter is enabled one data byte earlier for counting during a frame.

SUMMARY

It is an object of the invention to provide a transmission system which effects a reduction of the low-frequency phase error.

The object is achieved by a transmission system of the type defined in the opening paragraph in that the comparator is provided for changing the state of a first comparing signal derived from the first input signal and/or the state of a second comparing signal derived from the second input signal, or the state of the output signal resulting from a combination of the two comparing signals at instants denoted by an auxiliary signal whose frequency deviates from the frequency of the signal to be changed.

In the transmission system according to the invention, the comparator is supplied with an auxiliary signal for changing the state of one or more signals processed in the comparator. The comparator may form part of a control circuit, for example, for producing an oscillator signal or a justification value for the control of a read counter. A first or second comparing signal is obtained, for example, by coding a first or second input signal. A comparing signal, however, may also be identical with the input signal. A coding of an input signal may be effected, for example, by a counter. A 1-bit output signal or one or various 1-bit output signals of the counter form a comparing signal. The counter thus produces either a serial signal from a 1-bit output signal of the counter, or one or more serial signals from a 1-bit output signal of the counter as a parallel signal.

The auxiliary signal effects a change of state in the first and second or only in the first or only in the second comparing signal. A change of state may be made not only in the first and the second comparing signal, but also in the signal that is a combination of the comparing signals. This signal could be, for example, the output signal of the comparator.

A change of state of a signal is meant to be understood as, for example, a lengthening or shortening of pulses or pulse pauses or the de-interleaving or multiplying of pulses in a signal at specific instants predefined by the auxiliary signal. The frequency of the auxiliary signal deviates from that of the signal to be changed.

The measures according to the invention cause a reduction of the low-frequency and, as applicable, high-frequency phase errors, because the dependence between a phase error and an input signal affected by the auxiliary signal is reduced. The phase error is changed in such a way that a switch element included in the transmission system reduces the phase error. Such a switch element is, for example, a filter in the control circuit or a control circuit in a desynchronizing circuit in the demultiplexer of the transmission system.

A comparator which forms, for example, part of a phase-locked loop (PLL) for producing an oscillator signal, comprises a first converter circuit and a comparative counter. The first converter circuit is provided for producing the first input signal and the auxiliary signal and for generating a changed-state first comparing signal and/or a second converter circuit is provided for producing the second input signal and the auxiliary signal and for generating a changed-state second comparing signal. The comparative counter is used for receiving on its enable input the changed-state first comparing signal generated by the first converter circuit and, on its clock input, the second input signal as a second comparing signal, or for receiving on its enable input the first input signal as a first comparing signal and for receiving, on its clock input, the second comparing signal generated by the second converter circuit, or for receiving on its enable input the first comparing signal generated by the first converter circuit, and on its clock input, the second comparing signal generated by the second converter circuit. This comparator cannot effect a change of state in the combined comparing signals. The comparator can be used in a control circuit of a synchronizing circuit or of a desynchronizing circuit.

A converter circuit is arranged for forming a changed-state comparing signal from an input signal that on average has the same frequency or a multiple of the frequency of the changed-state comparing signal and whose edges are for the greater part shifted relative to the edges of the changed-state signal. The converter circuit thus effects a frequency division and a phase modulation, as required.

An embodiment for a first or second converter circuit comprises a first and a second counter, a first flip-flop and an AND-gate. The first counter is arranged for receiving an input signal and for producing a comparing signal from a 1-bit output signal of the counter. The first flip-flop is arranged for receiving the auxiliary signal on its clock input and for receiving, on a flip-flop input, the signal produced by the AND-gate which AND-gate signal represents a combination of the comparing signal and a transmit signal from the second counter. The second counter is arranged for receiving the auxiliary signal on its clock input, for receiving the inverted output signal of the first flip-flop on its enable input, for producing the transmit signal from its transmit output signal and for producing a changed-state comparing signal from a 1-bit output signal of the second counter. The first counter is a coder for converting an input signal into a comparing signal. The change of state of a comparing signal is effected by the first flip-flop, the AND-gate and the second counter.

Another embodiment for a comparator comprises a third and a fourth counter, a first and a second adapting circuit and a subtracter. The third counter is provided for receiving the first input signal and for producing the output signal of the third counter as a first comparing signal and the fourth counter is provided for receiving the second input signal and for producing the output signal of the fourth counter as a second comparing signal. The first and second adapting circuits are used each for receiving the auxiliary signal and the first and second comparing signals and for changing the state of the first and second comparing signals. The subtracter is coupled to the outputs of the two adapting circuits. This comparator can be used in a phase-locked loop for generating an oscillator signal or in a control circuit for controlling justification or dejustification actions.

The adapting circuit is used for synchronizing a comparing signal with the auxiliary signal. For this purpose, this circuit comprises a first buffer store, whose clock input is provided for receiving the auxiliary signal, for buffering applied values.

If the control circuit forms part of a synchronizing circuit for equalizing frequency and/or phase variations between an incoming and an outgoing signal, the third counter arranged as a write counter is provided for generating write addresses for data to be entered in a buffer store and the fourth counter arranged as a read counter is provided for generating read addresses for data to be read from the buffer store. The subtracter is used for applying its output signal to a controller included in the control circuit for controlling the read counter. The write and read counters apply each to their own adapting circuit comparing signals derived or coded from the input signals. The sequence of the write addresses forms the first and the sequence of the read addresses forms the second comparing signal.

The subtracter, which also forms part of the comparator just like the write and read counters and the adapting circuits, forms an output signal for a controller. The controller includes a low-pass filter which receives the output signal of the subtracter, a justification decision circuit and a data generator. The function of the low-pass filter is to reduce the phase error changed by the auxiliary signal. The justification decision circuit is used for evaluating the output signals of the low-pass filter and for applying justification values to the data generator which controls the justification actions. The data generator determines the instant of a justification action by a frame count. In the case of a justification action the read counter is accordingly controlled by the data generator. The justification indication bits are inserted at predefined locations in the frame in the outgoing signal via pointer values formed by the data generator.

Also in the case of the incoming signal, pointer values for controlling the write counter are to be evaluated. For this purpose is used a data analyzer in the synchronizing circuit, which analyzer is provided for analyzing the incoming data and for controlling the write counter.

In a synchronizing circuit for an STM-1 transmission system, the equalization of frequency and phase variations can also be realised in a different manner.

From DE-43 32 761 is known a system in which first there is a clock alignment in a preprocessing stage and a pointer evaluation in a subsequent stage. The controller in the preprocessing stage is structured as a justification decision circuit which is provided for generating a control signal at least once per frame of the outgoing signal, which control signal indicates a negative justification action when a value derived from the output value of the subtracter falls short of a first threshold value, and indicates a positive justification action when the value derived from the output value of the subtracter exceeds a second threshold which is higher than the first threshold. In a predefined range of each frame of the outgoing signal the read counter is provided for generating at least a double read address (read counter is stopped) when a positive justification action is indicated by the control signal, and to skip at least one read address when a negative justification action is indicated by the control signal.

In said comparator is included a subtracter which receives the write addresses which are synchronized with the auxiliary signal, and the read addresses. The synchronization with the auxiliary signal is effected with a first buffer store (for example, a register). If exactly at the instant of writing, a change of the write or read address has occurred, the write or read address can often not be written correctly. If, for example, at the instant of writing in the first buffer store, a first bit location of the write or read address has already changed, but a second bit location of the write or read address has not, there will be an erroneous write or read address. In order to minimize this error, an adapting circuit comprises a first decoder whose output is coupled to the input of the first buffer store and which is provided for decoding the received input values in a cyclic code. This cyclic code is, for example, the Gray code. The first decoder is provided for converting the Dual-code encoded input values into a Gray code. Furthermore, the adapting circuit includes a second buffer store whose output is coupled to the input of the first buffer store, for buffering the output values coming from the first decoder and for receiving on its clock input a signal correlated with the produced values. A second decoder is provided for converting the output values of the first buffer store coded in the Gray code into Dual-code values.

The invention likewise relates to a control circuit which comprises a comparator for comparing a first input signal and a second input signal. The comparator is then provided for changing the state of a first comparing signal derived from the first input signal and/or the state of a second comparing signal derived from the second input signal or the state of the output signal that is a combination of the two comparing signals at instants indicated by an auxiliary signal whose frequency deviates from the frequency of the signal to be changed.

These and other aspects of the invention will be apparent from and elucidated with reference to the embodiments described hereinafter.

DESCRIPTION OF THE PREFERRED EMBODIMENTS

Figure 1:
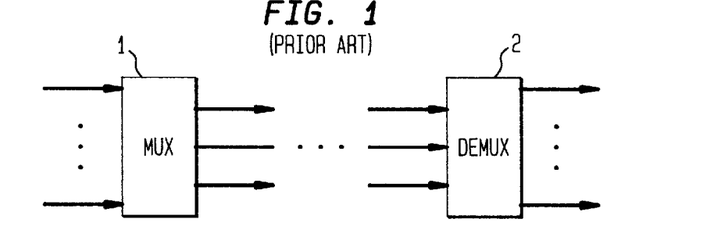
FIG. 1 shows a transmission system with a multiplexer and a demultiplexer.

FIG. 1 shows a transmission system comprising a multiplexer 1 and a demultiplexer 2. It is possible that still further circuit elements (not shown) are present between the multiplexer 1 and the demultiplexer 2. The multiplexer 1 receives, for example, plesiochronous signals at a bit rate of about 140 Mbit/s and forms therefrom STM-1 signals of the synchronous digital hierarchy (compare CCITT Recommendation G.709). For example, an STM-16 signal is generated from the STM-1 signals in the multiplexer 1. The demultiplexer 2 receives the STM-16 signal and recovers therefrom the plesiochronous signals. The multiplexer I may also generate various transport units (for example, TU-12) of the synchronous digital hierarchy from a plesiochronous signal (for example, bit rate of about 2 Mbit/s) or also receive a synchronized signal and produce a synchronized signal. For example, an STM-1 signal is applied to the multiplexer 1 which again produces an STM-1 signal.

Prior to the multiplexing, the multiplexer 1 effects a clock alignment between the clock signal (write clock signal) derived from the incoming signal and a local clock signal (read clock signal) via a synchronizing circuit. Subject hereto, justification actions are performed in the synchronizing circuit 1 at specific locations defined by the frames of the outgoing signal. With a negative justification action e.g. a data byte is inserted at a location provided for justification actions. In the case of a positive justification action e.g. a byte (stuff byte) without information is inserted at a justification location provided for that purpose.

In a desynchronizing circuit in the demultiplexer 2 the effected stuffing actions are cancelled. The desynchronizing circuit then generally uses a phase-locked loop by which the high-frequency phase error caused by the justification actions are filtered out. Suitable measures in the synchronizing circuit can provide that the low-frequency phase error can largely be shifted to the high-frequency range. A further reduction of the low-frequency phase error can be achieved with the measures to be discussed in the following.

Figure 2:
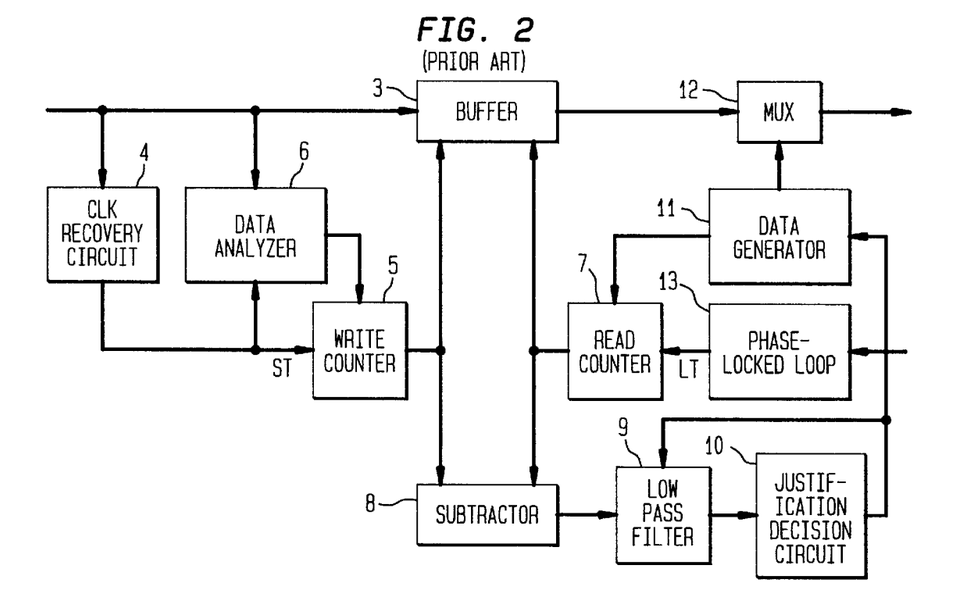
FIG. 2 shows a known synchronizing circuit which can be used in the multiplexer shown in FIG. 1.

FIG. 2 shows a diagrammatic representation of a synchronizing circuit of the multiplexer 1 known, for example, from EP-0 507 385 A2 or the article "Network synchronization—A Challenge for SDH-SONET?" M. J. Klein and R. Urbansky, IEEE Communications Magazine, September 1993, vol. 31, no. 9, pages 42 to 50. A buffer store 3 receives data of the incoming signal which are to be buffered. A write clock signal ST is generated from the incoming signal by a clock recovery circuit 4. The write clock signal ST is conveyed to a write counter 5 which generates write addresses and applies them to the buffer store 3.

If the buffer store 3 is supplied, for example, with an STM-1 signal, justification indication bits (in pointer values) still available in the signal are to be taken into account. For this purpose is used a data analyzer 6. It stops the write counter at the occurrence of specific data of the incoming signal. The data analyzer further receives the write clock signal ST.

The reading of the data from the buffer memory 3 is controlled by the read counter 7. The write addresses and the read addresses are applied to a subtracter 8 which forms difference values. The output of the subtracter 8 is coupled to a justification decision circuit 10 via a low-pass filter 9. The justification decision circuit 10 supplies justification values to a data generator 11 which controls a multiplexer 12 for the production of the frame synchronized outgoing signal and the read counter 7. The output values of the justification decision circuit 10 are also applied to the low-pass filter 9. The justification indication bits and the control information are inserted into the outgoing signal via the data generator 11. Furthermore, the data generator 11 stops the read counter 7, for example, in the case of a negative justification action. The read counter 7, the write counter 5, the subtracter 8, the low-pass filter 9, the justification decision circuit 10 and the data generator 11 form a control circuit for controlling the reading operation of data from the buffer store.

The read counter 7 further receives a read clock signal LT from a further control circuit 13 (phase-locked loop), which receives control or synchronizing information, for example, from a management system used for controlling and monitoring the transmission system.

Figure 3:
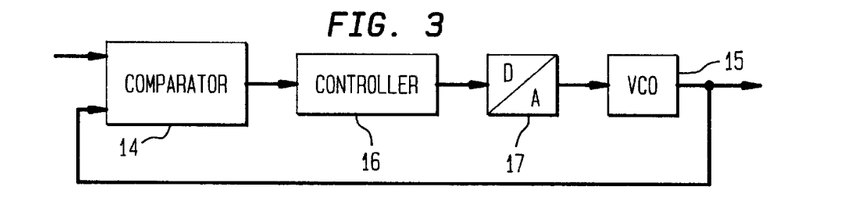
FIG. 3 shows a known phase-locked loop which can be used in the synchronizing circuit.
Figure 4:
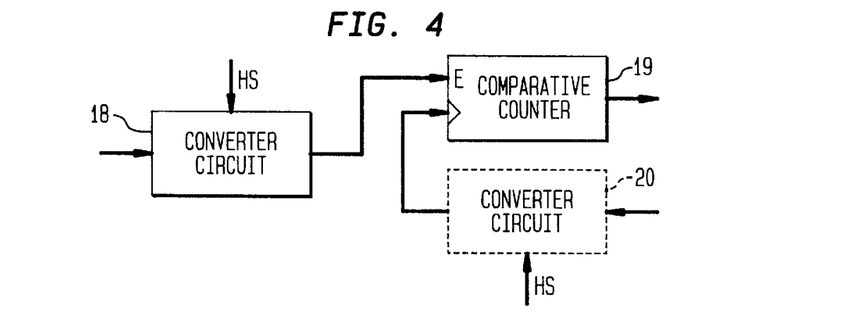
FIG. 4 shows a comparator operating according to the invention, which can be used in the phase-locked loop shown in FIG. 3.

An illustrative embodiment for a phase-locked loop 13 is shown in FIG. 3. A comparator 14 receives a first input signal. A second input signal which corresponds to an oscillator signal or the read clock signal is also supplied to the comparator 14 by a voltage-controlled oscillator 15. The output signal of the comparator 14 is applied to a controller 16, whose control signal is received by the voltage-controlled oscillator 15 via a digital-to-analog converter 17.

According to the invention, a reduction of the phase error in the transmission system is achieved when a comparator in a control circuit of the transmission system is complemented by specific measures to be described in the following. The comparator 14 shown in FIG. 3 comprises a first converter circuit 18 which receives the first input signal and an auxiliary signal HS. The frequency of the auxiliary signal HS deviates from the frequency of the first input signal. As a rule, this is a minor deviation. The auxiliary signal HS provides that a changed-state first comparing signal which is applied to a enable input E of a comparative counter 19 is formed from the first input signal. The second input signal is applied to the clock input of the comparative counter 19. The comparative counter 19 counts the clocks of the second input signal only for a specific period of time of the changed-state first comparing signal (for example, when the changed-state comparing signal is logic "1"). The contents of the comparative counter 19 are applied to the controller 16.

A second converter circuit 20 can also generate a changed-state second comparing signal from the second input signal via the auxiliary signal HS. The changed-state signal is fed to the clock input of the comparative counter 19. In this case it is also possible to omit the first converter circuit 18 and send the first input signal direct to the enable input E of the comparative counter 19.

Figure 5:
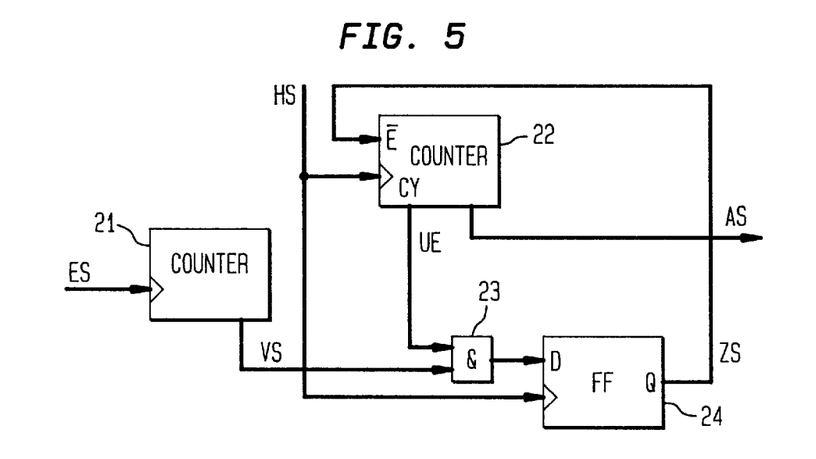
FIG. 5 shows a converter circuit which can be used in the comparator shown in FIG. 4.

An illustrative embodiment for a first or second converter circuit 18 or 20 is shown in more detail in FIG. 5. A converter circuit 18 or 20 comprises a first counter 21, a second counter 22, an AND-gate 23 and a first flip-flop 24. The two counters 21 and 22 may be 2-bit counters. The counter 21 receives the first or second input signal ES on its clock input. The higher-order output of the first counter 21 applies a comparing signal VS to an input of the AND-gate 23. The frequency of the comparing signal VS as against the frequency of the input signal ES is reduced by the factor of 4. The frequency division performed by the counter 21 may also be denoted as coding. The comparing signal VS represents a coded input signal ES. The second input of the AND-gate 23 is supplied with a carrier signal UE from a carry output CY of the second counter. The output of the AND-gate 23 is connected to the D-input of the first flip-flop 24, whose clock input just like the clock input of the counter 22 receives the auxiliary signal HS. The Q-output of the flip-flop 24 applies an intermediate signal ZS to the inverted enable input E̅ of the counter 22. The changed-state comparing signal AS of the converter circuit 18 or 20 is produced by the low-order output of the counter 22.

Figure 6:
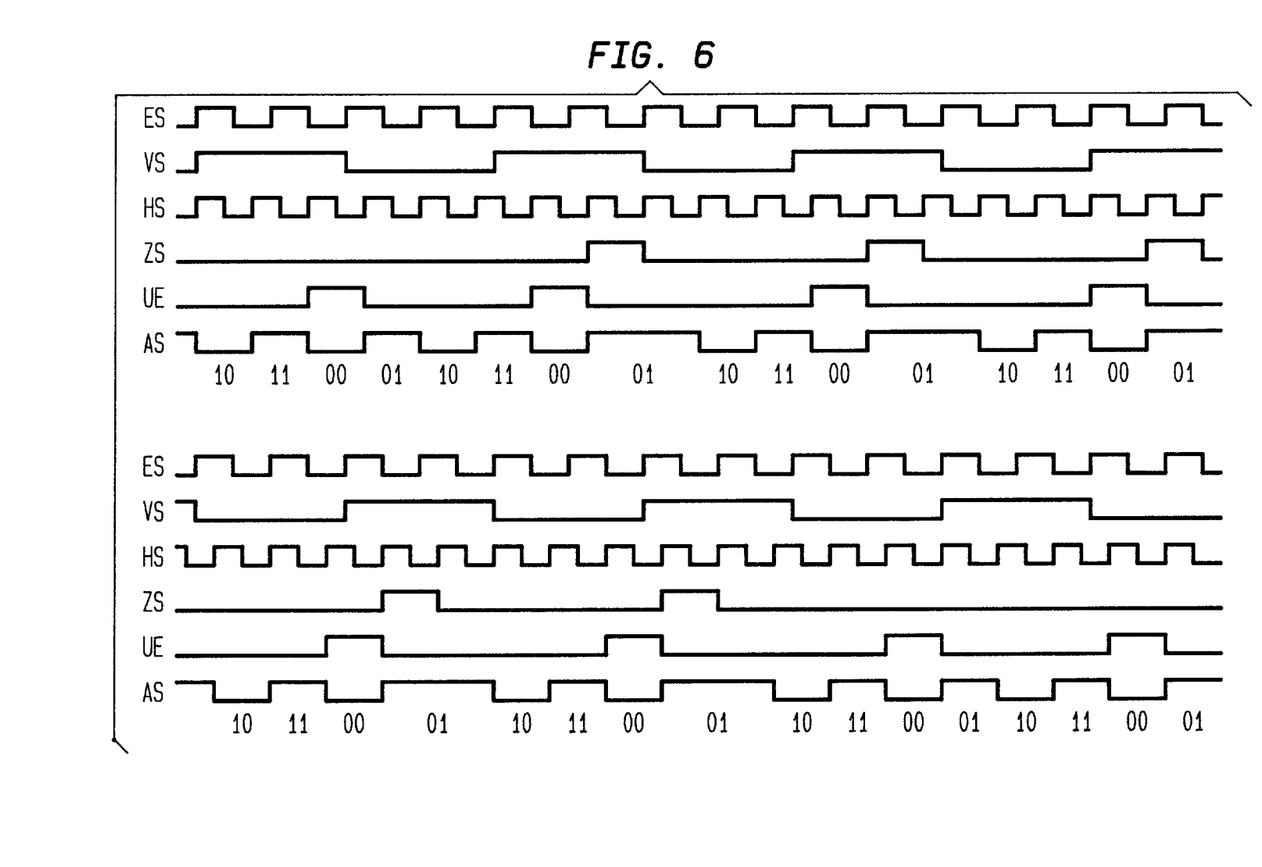
FIG. 6 shows a time diagram in explanation of the operation of the converter circuit shown in FIG. 5.

FIG. 6 shows a time diagram for the various signals ES, VS, HS, ZS, UE and AS which occur in the converter circuit 18 or 20. The value of the signal produced by the AND-gate 23 is transferred by the flip-flop 24 at the occurrence of each positive edge of the auxiliary signal HS on its output Q. If the intermediate signal ZS is logic "1", the counter 22 is stopped. When the counter 22 produces a carry (cf. carry signal UE), a logic "1" appears on the Q-output of the flip-flop 24 when a pulse of the auxiliary signal HS occurs. As can be learnt from FIG. 6, the changed-state comparing signal AS has pulses of different lengths, which pulses are caused by the auxiliary signal HS. The figures underneath the signal AS indicate the count of the counter 22. The changed-state comparing signal AS has a frequency which is on average a factor of 2 lower than the frequency of the input signal ES. Also the edges of input signal ES and changed-state comparing signal AS are shifted. Due to the irregularities or changes of state caused in the comparing signal, the phase error in the transmission system is reduced.

Alternatively, in lieu of the changed-state comparing signal AS, it is possible to use the 1-bit output signal produced by the other output of the counter 22. In that case the changed-state comparing signal has a lower frequency.

Figure 7:
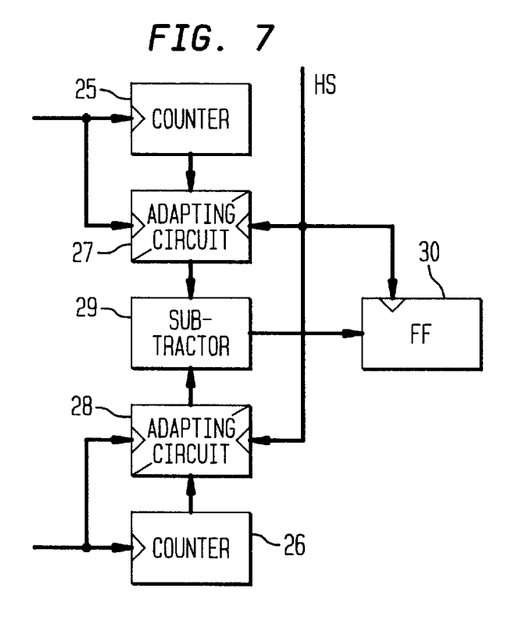
FIG. 7 shows a further comparator operating according to the invention, which can be used in the phase-locked loop shown in FIG. 3.
Figure 8:
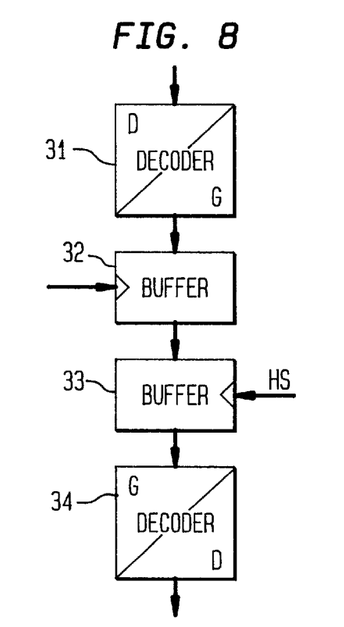
FIG. 8 shows an adapter circuit used in the comparator shown in FIG. 8.

An illustrative embodiment for another comparator for a control circuit is shown in FIG. 7. The comparator comprises a third and a fourth counter 25 and 26, a first and a second adapting circuit 27 and 28, a subtracter 29 and a flip-flop 30. The third counter 25 receives the first input signal on its clock input and produces a sequence of counts as a comparing signal on its count output. The first adapting circuit 27 aligns the clocks of the first input signal and the auxiliary signal HS. An embodiment for the adapting circuit 27 or 28 is shown in FIG. 8. The adapting circuit 27 or 28 comprises a first decoder for converting Dual-code values into Gray-code values, two buffer stores 32 and 33 and a second decoder 34 for converting Gray-code values into Dual-code values. After Dual-code values of the comparing signal have been converted into Gray-code values in the first decoder 31, the values produced by the first decoder 31 are buffered in buffer store 32. The buffer store 31 may be arranged as a register which receives the input signal on its clock input. The buffer store 33, which is also arranged as a register and receives the auxiliary signal HS on its clock input, buffers the values produced by buffer store 32. The output of the buffer store 33 is connected to the second decoder 34 which produces Dual-code values after the conversion.

The buffer stores 32 and 33 are used for synchronizing the values with the auxiliary signal HS. When there is a change of the state of the counter (for example, counter 25), the count can often not be buffered correctly. If, for example, at the instant of buffering in the buffer store 32, a first bit position of the counter has already changed, whereas a second bit position of the counter has not, there will be a faultily entered count. In order to minimize this error, a Dual/Gray-code conversion is effected. A Gray-code is a cyclic code in which not more than one bit position changes for consecutive values.

The values produced by the adapting circuit 27 are applied to an input of the subtracter 29. The other input of the subtracter 29 receives values from the second adapting circuit 28 which is supplied with counts from the fourth counter 26 and whose clock inputs, just like the adapting circuit 27, are supplied with the second input signal and the auxiliary signal HS. The output values of the subtracter 29 are buffered in the flip-flop 30 which receives the auxiliary signal HS on its clock input. The adapting circuits 27 and 28 perform state changes in the comparing signals supplied by the counters 25 and 26.

The comparator shown in FIG. 7 may be used in the phase-locked loop shown in FIG. 3, or in the synchronizing circuit shown in FIG. 9 to be described in the following. The synchronizing circuit shown in FIG. 9 includes, just like the known synchronizing circuit shown in FIG. 2, a buffer store 35 for buffering incoming data of a signal, a clock recovery circuit 36 for generating a write clock signal ST, a write counter 37 for generating write addresses, a data analyzer 38 for evaluating pointer values, a read counter 39 for generating read addresses, a subtracter 40 forming difference values, a low-pass filter 41, a justification decision circuit 42 producing stuffing values, a multiplexer circuit 43 for forming the outgoing signal, a data generator 44 for controlling the read counter 39 and the multiplex circuit 43 and a phase-locked loop 45 for generating the read clock signal LT. The phase-locked loop 45 receives control or synchronizing information, for example, from a management system used for controlling and monitoring the transmission system.

Figure 9:
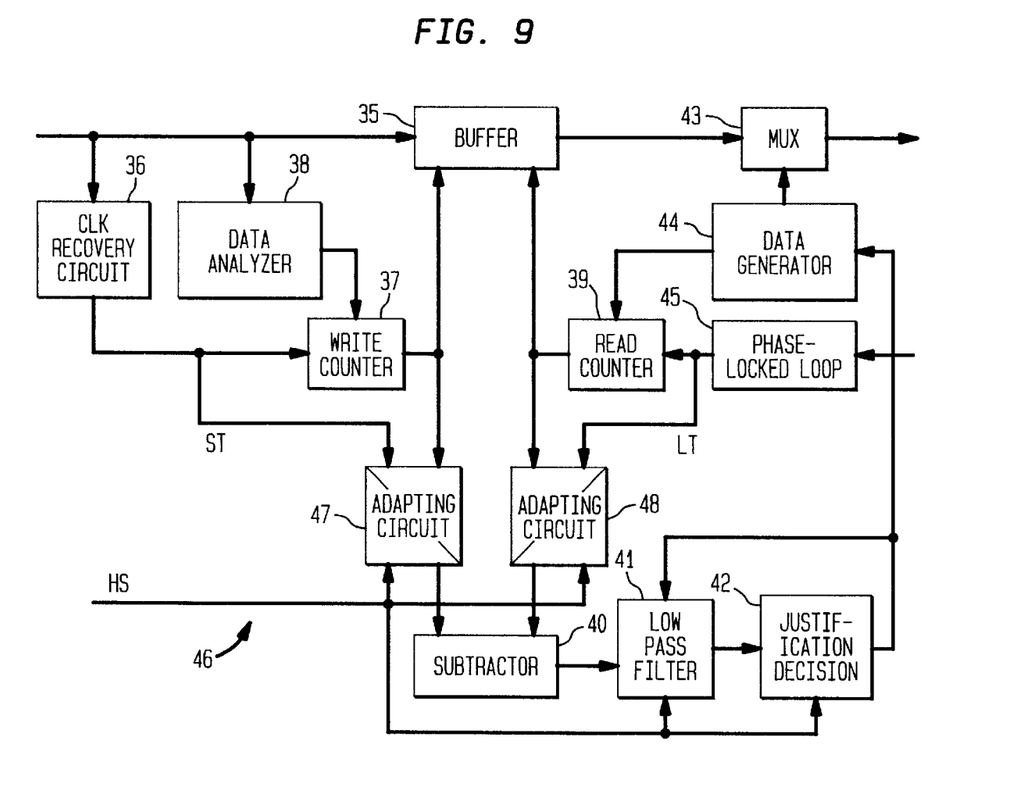
FIG. 9 shows a synchronizing circuit according to the invention.

The new comparator 46 shown in FIG. 9 and used in the synchronizing circuit comprises two adapting circuits 47 and 48 in addition to the write counter 37 (third counter), the read counter 39 (fourth counter) and the subtracter 40. The adapting circuit 47 receives the write addresses from the write counter 37, the write clock signal ST and an auxiliary signal HS. The write address synchronized with the auxiliary signal HS is applied to an input of the subtracter 40. The adapting circuit 48 receives the read addresses from the read counter 39 in addition to the read clock signal LT and the auxiliary signal HS. The subtracter 40 receives read addresses synchronized with the auxiliary signal HS. The two adapting circuits 47 and 48 correspond to the adapting circuits shown in FIG. 8.

The low-pass filter 41 and the justification decision circuit 42 further receive the auxiliary signal HS for timing. It is also possible that further circuit elements receive the auxiliary signal HS for timing.

The read counter 39, the write counter 37, the adapting circuits 47 and 48, the subtracter 40, the low-pass filter 41, the justification decision circuit 42 and the data generator 44 form a control circuit for controlling the reading of data from the buffer memory 35. Furthermore, the low-pass filter 41, the justification decision circuit 42 and the data generator 44 form a controller.

The changes of state in the sequences of the write and read addresses effect a reduction of the phase error in the transmission system.

The synchronizing circuit shown in FIG. 9 can also be divided into a preprocessing circuit for a clock alignment and in a post-processing circuit for pointer evaluation. Such a preprocessing circuit is known from DE-43 32 761 and is shown in FIG. 10 together with further switching elements.

Figure 10:
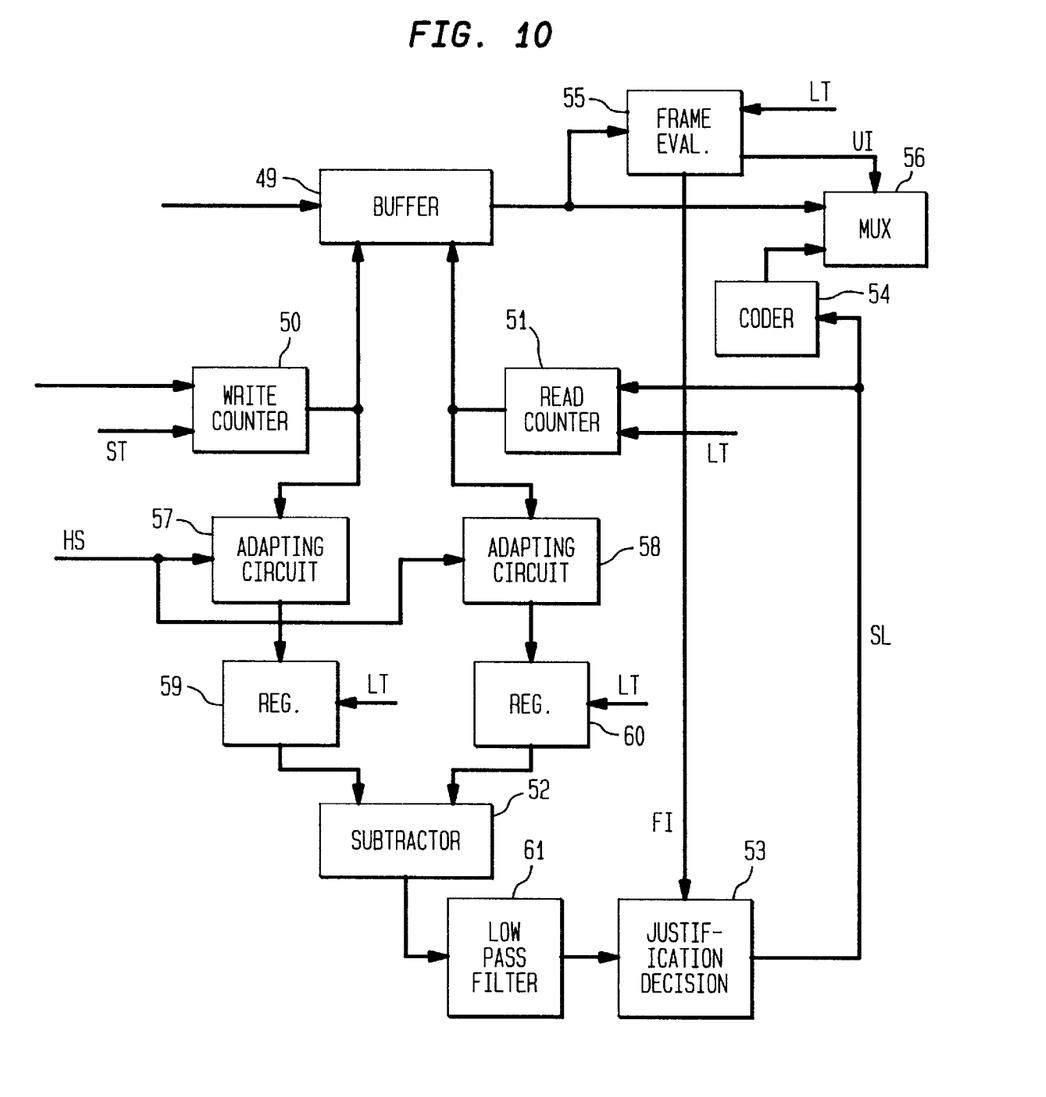
FIG. 10 shows a preprocessing circuit for a further synchronizing circuit according to the invention for a further synchronizing circuit.

The preprocessing circuit shown in FIG. 10 comprises a buffer store 49 receiving, for example, an STM-1 signal, a write counter 50 (third counter), a read counter 51 (fourth counter), a subtracter 52, a justification decision circuit 53, a coder 54, a frame evaluation circuit 55, a multiplexer 56, two adapting circuits 57 and 58, two registers 59 and 60 and a low-pass filter 61. The write counter 50, which may be arranged as a modulo-4 counter, receives the write clock signal ST and generates a write address with each clock signal. The write addresses generated in the cyclic Gray-code are cyclically recurrent. The write addresses are applied to the buffer store 5 and to the adapting circuit 57, which adapting circuit 57 receives the auxiliary signal HS on its clock input. Between the output of the adapting circuit 57 and an input of the subtracter 52 is connected the register 59 which receives the read clock signal LT.

For performing the reading operation, the read counter 51, which may also be arranged as a modulo-4 counter and receives the read clock signal LT, applies read addresses to the buffer store 49. The read counter 51 further receives a control signal SL from the justification decision circuit 53. If the control signal SL indicates a positive justification action, the most Recently produced read address is produced once again (read counter 51 is stopped). If a negative justification action is indicated in the control signal SL, the actually next read address is skipped.

The sequence of the read addresses is not only applied to the buffer store 49, but also to the adapting circuit 58 which receives the auxiliary signal HS on its clock input and is formed, just like the adapting circuit 57, by a buffer store (register). A further register 60 receiving the read clock signal LT is connected between adapting circuit 58 and subtracter 52.

The adapting circuits 57 and 58 are used for adapting the write and read addresses to the auxiliary clock. The registers 59 and 60 in their turn adapt the addresses produced by the adapting circuits 57 and 58 to the read clock signal LT.

The justification decision circuit 53 produces the control signal SL and at a specific instant receives not only the read clock signal LT, but also an enable pulse FI. If the enable pulse FI occurs, the justification decision is made. The justification decision circuit 53 compares the value produced by the subtracter 52 via the low-pass filter 61 to a first and a second threshold. The first threshold corresponds to a lower fill of the buffer store 49 and a second threshold to an upper fill of the buffer store 49. If the value produced by the subtracter 52 falls short of the first threshold, negative justification is to be applied, and the control signal SL generated by the justification decision circuit contains an indication about a negative justification action. If the value produced by the subtracter 52 exceeds the second threshold, the control signal SL is produced by the justification decision circuit 53 with a positive justification action.

Negative justification is to take place if the frequency of the read clock signal LT is lower than the frequency of the write clock signal ST. If the frequency of the read clock signal LT is higher than the frequency of the write clock signal ST, positive justification is to take place. In the case of a negative justification action, the frame of the outgoing STM-1 signal is shortened by one byte at a predefined position and in the case of a positive justification action the outgoing signal is extended at a specific position in the frame. This is achieved via the read counter 51 which in the case of a change of the control signal SL, either produces a read address twice or skips a read address.

The justification decision circuit 53 together with the low-pass filter 61 forms the controller of the control circuit which comprises write counter 50, read counter 51, adapting circuits 57 and 58, registers 59 and 60 and subtracter 52. The control circuit controls the read counter 51.

The enable pulse Fl for the justification decision circuit 53 is generated by the frame evaluation circuit 55 which receives the read clock signal LT and the data stream coming from buffer store 49. Such a frame evaluation circuit 55 recognizes the beginning of the frame of an STM-1 signal and counts the bytes of the STM-1 frame. If a counter included in the frame evaluation circuit 55 reaches a count which corresponds to the beginning of the predefined range (first byte of the fifth row of the STM-1 frame or first B2 byte), the frame evaluation circuit 55 produces the enable pulse. When the second B2 byte (second byte in the fifth row of the STM-1 frame) occurs, the frame evaluation circuit 55 generates a switch signal UI for the multiplexer 56.

The first input of the multiplexer 56 is connected to the output of the buffer store 49 and the second input of the multiplexer 56 is connected to the coder 54 which receives the control signal SL. Only while the switch signal UI is available is the second input of the multiplexer 56 connected to its output. Otherwise, the first input of the multiplexer 12 is coupled to the output of multiplexer 56. The coder 54 produces a codeword which indicates whether a positive, a negative or no justification action takes place. This codeword is inserted as a second B2 byte into the outgoing STM-1 signal by means of the multiplexer 56 and the frame evaluation circuit 55.

We claim:

1. A control circuit for use in a transmission system including a comparator having a first input, a second input and an output for comparing input signals supplied to the first and second inputs and yielding a result of the comparing at the output, the comparator further comprising:

a first converter circuit supplied with a first input signal at a first frequency and an auxiliary signal for generating a changed-state first comparing signal;

a second converter circuit supplied with a second input signal at a second frequency and the auxiliary signal for generating a changed-state second comparing signal; and a comparative counter having an enable input, a clock input and an output, the changed-state first comparing signal being supplied to the enable input and the changed-state second comparing signal being supplied to the clock input, the comparative counter being responsive to the changed-state first and second comparing signals to count clocks in the changed-state second comparing signal for an interval defined by the changed-state first signal being in a predetermined state and to supply its count at its output, wherein the auxiliary signal has a frequency that deviates from the frequency of the first input signal.

2. The invention as defined in claim 1 wherein the first converter circuit is arranged for generating the changed state first comparing signal from the first input signal that on average has a frequency which is a multiple, the multiple being one (1) or more, of the frequency of the changed-state first comparing signal and has edges that are for the most part shifted relative to edges of the changed-state first comparing signal, and the second converter circuit is arranged for generating the changed state second comparing signal from the second input signal that on average has a frequency which is a multiple, the multiple being one (1) or more, of the frequency of the changed-state second comparing signal and has edges that are for the most part shifted relative to edges of the changed-state second comparing signal.

3. The invention as defined in claim 2 wherein the first converter circuit includes a first counter having a clock input and an output, a second counter having an inverted enable input, a clock input, a transmit output and an output, a first flip-flop having a signal input, a clock input and an output, and a first AND-gate having a first input, a second input and an output, the first input signal is supplied to the clock input of the first counter which is responsive to the first input signal to yield a 1-bit output signal at its output which forms the first comparing signal at its output, the first AND-gate being responsive to the first comparing signal being supplied to one of its first and second inputs and to a first transmit signal being supplied to the other input of the first AND-gate to yield a first ANDED signal at its output which is a first ANDED version of the supplied first comparing signal and the first transmit signal, the auxiliary signal being supplied to the first flip-flop clock input and the first ANDED signal being supplied to the first flip-flop signal input wherein the first flip-flop stores a current version of the first ANDED signal which is supplied as a first flip-flop output signal at its output, the auxiliary signal being supplied to the clock input of the second counter, the first flip-flop output signal being supplied to the inverted enable input of the second counter wherein the second counter yields the first transmit signal at its transmit output and yields a 1-bit output signal at its output which forms the changed-state first comparing signal at its output, and wherein the second converter circuit includes a third counter having a clock input and an output, a fourth counter having an inverted enable input, a clock input, a transmit output and an output, a second flip-flop having a signal input, a clock input and an output, and a second AND-gate having a first input, a second input and an output, the second input signal is supplied to the clock input of the third counter which is responsive to the second input signal to yield a 1-bit output signal at its output which forms the second comparing signal at its output, the second AND-gate being responsive to the second comparing signal being supplied to one of its first and second inputs and to a second transmit signal being supplied to the other input of the second AND-gate to yield a second ANDED signal at its output which is a second ANDED version of the supplied second comparing signal and the second transmit signal, the auxiliary signal being supplied to the second flip-flop clock input and the second ANDED signal being supplied to the second flip-flop signal input wherein the second flip-flop stores a current version of the second ANDED signal which is supplied as a second flip-flop output signal at its output, the auxiliary signal being supplied to the clock input of the fourth counter, the second flip-flop output signal being supplied to the inverted enable input of the fourth counter wherein the fourth counter yields the second transmit signal at its transmit output and yields a 1-bit output signal at its output which forms the changed-state second comparing signal at its output.

4. A control circuit for use in a transmission system including a comparator having a first input, a second input and an output for comparing input signals supplied to the first and second inputs and yielding a result of the comparing at the output, the comparator further comprising:

a first counter having an input and an output, which is responsive to a first input signal having a first frequency supplied to its input for generating a first comparing signal having at least first and second states at its output;

a second counter having an input and an output, which is responsive to a second input signal supplied to its input for generating a second comparing signal having at least first and second states at its output;

first adapting circuit having a first input, a second input and an output, the first comparing signal being supplied to the first input of the first adapting circuit and being responsive to an auxiliary signal being supplied to the second input of the first adapting circuit and having a frequency that deviates from the first frequency of the first input signal being supplied to the input of the first counter for changing the state of the first comparing signal to yield the changed state first comparing signal at its output;

a second adapting circuit having a first input, a second input and an output, the second comparing signal being supplied to the first input of the second adapting circuit and being responsive to the auxiliary signal being supplied to the second input of the second adapting circuit for changing the state of the first comparing signal to yield the changed state second comparing signal at its output; and a subtracter having a first input, a second input and an output, the output of the first adapting circuit and the output of the second adapting circuit being in circuit with the first input and second input, respectively, of the subtracter for subtracting the changed state first comparing signal and the changed state second comparing signal and for yielding a value representative of the subtraction result at its output.

5. The invention as defined in claim 4 wherein each of the first and second adapting circuits includes a buffer store having an input and a clock input to which the auxiliary signal is supplied for storing applied values supplied to its input.

6. The invention as defined in claim 4 further including a synchronizing circuit, which includes the control circuit, for equalizing frequency and phase variations between an incoming signal and an outgoing signal, the control circuit further including a controller having an input and an output and being responsive to the subtracter output for generating a read control signal at its output, the first counter being a read counter further including a control input, the second counter being a write counter, the read control signal being supplied to the control input for controlling operation of the read counter.

7. The invention as defined in claim 6 wherein the controller includes a low-pass filter having an input and an output, wherein the low-pass filter is responsive to the subtracter output being supplied to its input for yielding a low-pass filtered version thereof at its output, a justification decision circuit having an input and an output, for evaluating the low-pass filtered version of the subtracter output which is supplied to the justification decision circuit input to generate justification values at the justification circuit output, and a data generator responsive to the justification values for controlling justification actions.

8. The invention as defined in claim 7 wherein the synchronizing circuit includes a data analyzer responsive to an incoming data signal to the transmission circuit for generating write counter control signals.

9. The invention as defined in claim 7 wherein the justification circuit generates at least one read control signal during a frame of an outgoing data signal from the transmission circuit, the justification circuit evaluates the output values from the subtracter to determine if they have a value less than a first threshold value indicating a negative justification action or greater than a second threshold value indicating a positive justification action and generates a read control signal that causes the read counter to generate at least two consecutive identical read addresses when a positive justification action is indicated by the read control signal and to skip generating at least one read address when a negative justification action is indicated by the read control signal.

* * * * *